United States Patent [19]

Gulack

[11] 4,260,385
[45] Apr. 7, 1981

[54] EDUCATIONAL AND RECREATIONAL MATHEMATICAL KIT IN THE FORM OF A SET OF SQUARE STICKS

[76] Inventor: Max A. Gulack, 880 Fifth Ave., New York, N.Y. 10021

[21] Appl. No.: 935,040

[22] Filed: Aug. 18, 1978

[51] Int. Cl.³ .............................................. G09B 19/00
[52] U.S. Cl. .................................... 434/208; 283/1 R
[58] Field of Search ................ 35/30, 31 G, 70, 31 R, 35/69, 71; 283/1 R, 44

[56] References Cited

U.S. PATENT DOCUMENTS

| | | | |
|---|---|---|---|
| 2,899,757 | 8/1959 | Webb | 35/70 |
| 3,229,388 | 1/1966 | Smith | 35/70 |
| 3,628,261 | 12/1971 | Thompson | 35/70 |
| 3,829,996 | 8/1974 | Buschman | 35/70 |
| 3,999,310 | 12/1976 | Lufkin et al. | 35/70 |

*Primary Examiner*—John W. Shepperd
*Attorney, Agent, or Firm*—Jordan and Hamburg

[57] ABSTRACT

An educational and recreational mathematical kit comprises a set of n square sticks and a plurality of individual digits imprinted on each of the four sides of each of the sticks. The digits on one side of one of the sticks constitute a number which is a quotient obtained by dividing a number constituted of (P−1)/n nines, in which P is a prime number greater than 11 and n is an integer at least 2, by P, n being so selected that (P−1)/n nines is the minimum number of nines divisible by P so that the quotient is an integral number. The digits on each of the other three sides of the one stick constitute a number which is a respective different cyclic variation of the quotient, the quotient having (P−1)/n digits including one or more actual or imaginary initial zeros to make up any otherwise occurring one or more digit deficit in the quotient and each cyclic variation of the quotient being formed by shifting a set of 1 to [(P−1)/n]−1 of the digits from the one end of the number to the other end of the number without changing the sequence of digits. The digits on one side of each of the other sticks each constitute a respective different number which is a respective different multiple of the quotient, each said multiple of the quotient not being a said cyclic variation of the quotient or of any other said multiple of the quotient. The digits on each of the other three sides of each of the other sticks each constitute a number which is a respective different cyclic variation of the respective multiple of the quotient on the one side of that stick.

4 Claims, 6 Drawing Figures

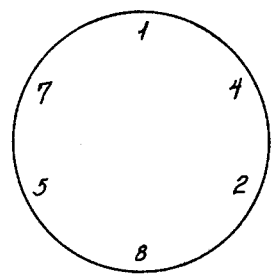
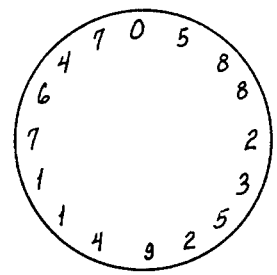
FIG. 1   FIG. 2
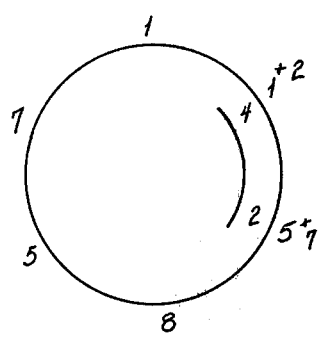
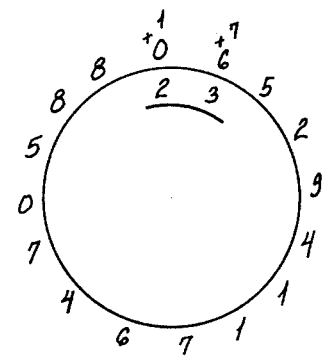
FIG. 3   FIG. 4
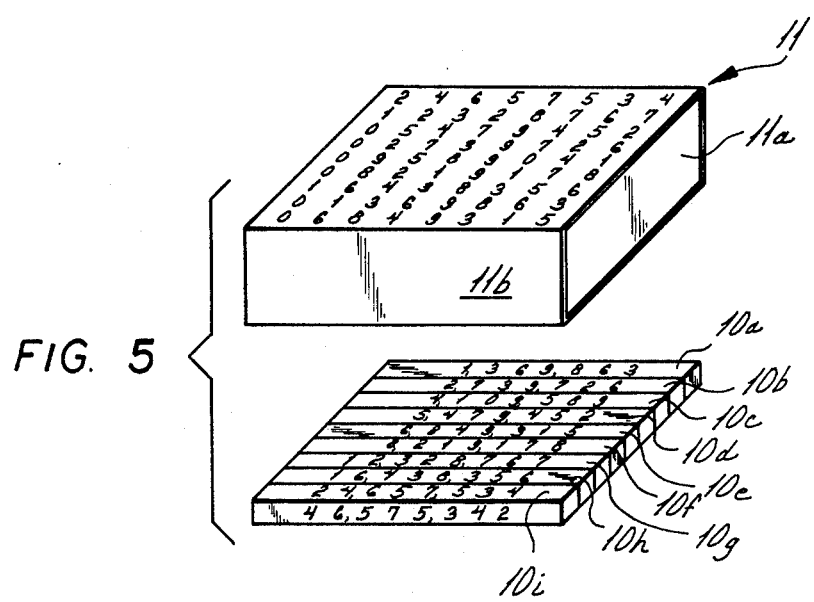
FIG. 5

EDUCATIONAL AND RECREATIONAL MATHEMATICAL KIT IN THE FORM OF A SET OF SQUARE STICKS

BACKGROUND OF THE INVENTION

This invention relates to educational and recreational devices or kits.

It is an object of the invention to provide educational and recreational devices designed to produce a mathematical semblance of magic or to provide education regarding surprising and fascinating aspects of number theory when certain games are played therewith. The mechanical devices of the invention are designed to implement certain rarely noticed and unexplored, or perhaps heretofore unknown, arithmetic facts concerning all prime numbers larger than 11, herein designated as "P".

Other objects and advantages of the invention will be apparent from the following description thereof.

SUMMARY OF THE INVENTION

According to the invention, there is provided an educational and recreational mathematical kit, comprising a set of n square sticks and a plurality of individual digits imprinted on each of the four sides of each of the sticks. The digits on one side of one of the sticks constitute a number which is a quotient obtained by dividing a number constituted of (P-1)/n nines, in which P is a prime number greater than 11 and n is an integer at least 2, by P, n being so selected that (P-1)/n nines is the minimum number of nines divisible by P so that the quotient is an integral number. The digits on each of the other three sides of the one stick contstitute a number which is a respective different cyclic variation of the quotient, the quotient having (P-1)/n digits including one or more actual or imaginary initial zeros to make up any otherwise occurring one or more digit deficit in the quotient and each cyclic variation of the quotient being formed by shifting a set of 1 to [(P-1)/n]−1 of the digits from one end of the number to the other end of the number without changing the sequence of digits in the set and by including in the quotient prior to the shifting said one or more initial zeros as the zero or zeros which make up any otherwise occurring deficit in the number of digits. The digits on one side of each of the other sticks each constitute a respective different number which is a respective different multiple of the quotient, each said multiple of the quotient not being a said cyclic variation of the quotient or of any other said multiple of the quotient. The digits on each of the other three sides of each of the other sticks each constitute a number which is a respective different cyclic variation of the respective multiple of the quotient on the one side of that stick.

BRIEF DESCRIPTION OF THE DRAWINGS

FIG. 1 is a diagram illustrating certain mathematical features of the invention;

FIG. 2 is another diagram illustrating certain mathematical features of the invention;

FIG. 3 is another diagram illustrating certain mathematical features of the invention;

FIG. 4 is another diagram illustrating certain mathematical features of the invention;

FIG. 5 is a perspective view of a kit embodying the invention;

DETAILED DESCRIPTION

Figure 6:
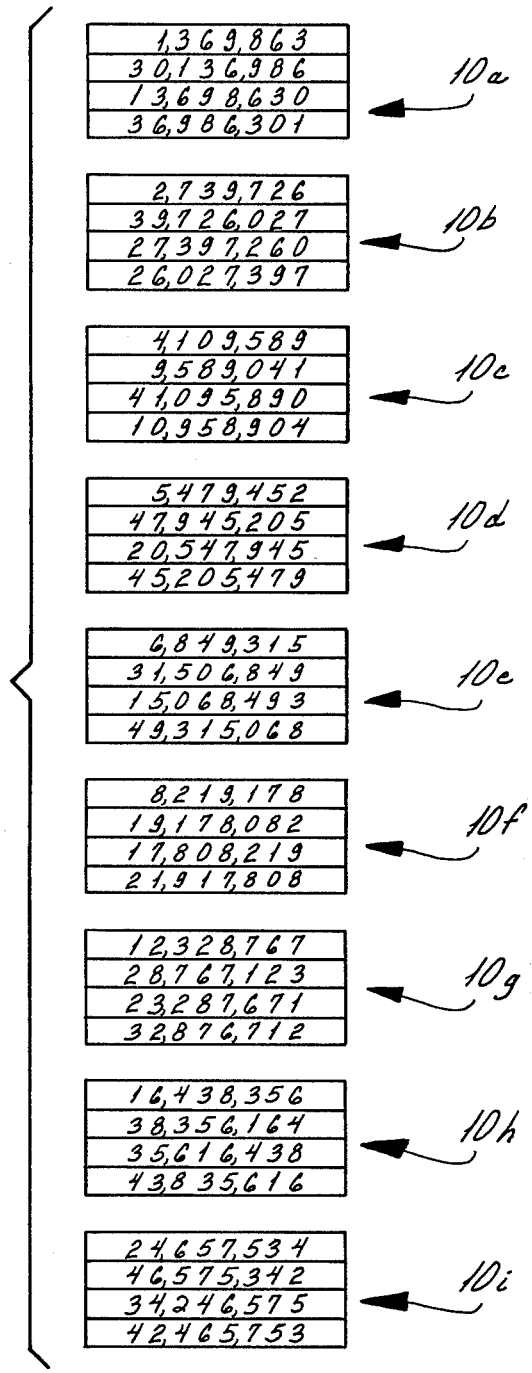
FIG. 6 is a set of diagrams showing all the faces of the sticks of the kit of FIG. 5.

The invention will now be further described by reference to more specific details thereof.

A row of P-1 nines is always divisible by P to give a quotient Q which is an integral number.

Whenever a smaller number of nines is divisible by P to give an integral quotient Q, the number will always consist of some integral fractional part of P-1 nines, which may be designated as (P-1)/n, in which n is an integer greater than 1.

For example, if P=7, then 999,999 divided by 7 will yield the quotient Q of 142,857, but for the prime 13, only 6 nines (one half of P-1) will suffice to produce the integral quotient Q of 076,923. For the purpose of this analysis and implementation of the games and devices herein described, the initial zeros of any quotient Q will be preserved or accounted for. It will be found that the number of digits, including any initial zeros, in the quotient Q will always be P-1 or some integral fraction of P-1. For example, when P=13, the number of digits in the quotient Q, including the initial zero, is (P-1)/2. In other words, in this case (P-1)/2 is the minimum number of nines which when divided by P gives an integral quotient Q.

Whenever the number of digits of the quotient Q is the full P-1, any multiple of the quotient Q containing the same number of digits will always be a "cyclic" variation of the quotient Q. This means that if the digits of the quotient Q were arranged clockwise on a circle, any such multiple of the quotient could be read off the resulting "dial" in the same clockwise fashion. The quotients Q of primes (P) 7 and 17, for instance, will produce the dials illustrated in FIGS. 1 and 2, respectively. The quotients Q are 142857 and 0588235294117647, respectively, and can be read from the respective dials clockwise starting at the top, and any multiple of these quotients Q, not exceeding the original number of digits, can be read directly from the applicable dial in clockwise order. Even if the multiple has more than the original number of digits in any case, the seeming magic of the "cyclic" quality of these quotients Q will still hold. Thus, for example, multiplying these exemplary quotients Q by 111 will produce additional digits. Each of these multiples may be wrapped around a dial spaced for its original number of digits, any overlapping digits are added up and in each case there is obtained a cyclic array of the original quotient Q. In FIGS. 3 and 4, these operations are illustrated for the quotients Q derived from the prime numbers P=7 and P=17, respectively. Thus, in FIG. 3, the multiple is 15857127, starting with  15
and ending with  27  overlapping,
if added up. =  42.

42 is thus included in the resulting cyclic array, which in the clockwise direction beginning with 1 reads as 142857, i.e., the original quotient Q. Similarly, in FIG. 4, the multiple is 065294117647058817, starting with  06
and ending with  17  overlapping, -continued

| if added up, = | 23. |
|---|---|

23 is thus included in the resulting cyclic array, which in the clockwise direction beginning with 0 reads as 0588235294117647, i.e., the original quotient Q.

In working with these cyclic numbers one need not necessarily arrange them clockwise. A normal linear array, such as a horizontal line-up, may be easily read in "cyclic" sequence by starting with any digit within the line-up, reading it to the end of the line, and then resuming at the beginning until all digits are used up. Additional digits may, whenever necessary, be eliminated or accounted for by carrying them from the left end of the line and adding them to the last digits on the right. The above cyclic numbers are only examples of the behavior of quotients Q with P-1 digits. All such quotients Q will behave in the same manner and can be manipulated accordingly. However, as stated above, Q may in some cases have only (P-1)/n digits in which n is an integer greater than 1. In all such cases there will always be n different basic multiples of Q (including Q itself, the "multiple" thereof being one) which have no cyclic relationship to each other, but any other multiples of Q will always be a cyclic variation of one of these basic multiples. For example, for P=13, the basic multiples are Q=076923 and 2Q=153846. Each and every other multiple of Q will be a cyclic variation of one of these two basic multiples and will behave exactly as shown above. Thus 5Q is a cyclic variation of 2Q and 4Q is a cyclic variation of Q and so forth. Consider, for example, $19 \times Q = 1461537$. Here there is a surplus digit "1" which should be added to the last digit as an overlapping digit, if 1461437 is arranged in a circle according to the system hereinabove illustrated, whereby 461538, a cyclic variation of 2Q, is obtained.

Another quality of Q and multiples thereof is utilized in rendering the devices and games of the present invention possible. It is found that if P is 2 digits, Q or any multiple of Q, if reduced to the original number of digits as aforesaid, will never contain any sequence of any 2 digits more than once. Any pair of digits will be exclusive and immediately determine the whole cyclic sequence of digits in such manner. If P is a 3-digit number, the same principle will apply to any sequence of 3 digits, and so forth.

There is still another quality of Q which proves useful. Whenever a number which is Q (or, in accordance with the general principles of the invention, any cyclic variation of Q or multiple of Q or multiple of any cyclic variation of Q, if reduced to the original number of digits as aforesaid) contains an even number of digits (including any initial zeros), every digit in the first half of the number will always be 9 minus the corresponding digit in the second half of the number. This also means that if the two halves of the number are added as separate numbers, the sum will consist solely of a series of nines. In a rare instance where Q has an odd number of digits, there will exist manipulations involving a cyclic variation of a multiple of Q whereby a number consisting solely of a series of nines will be obtained. For example, when P=41 and Q=02439, this latter rule is satisfied by a cyclic variation of 4Q. 4Q=09756 and 02439+97560=99999. Moreover, for each cyclic variation of any multiple of Q there will always be another multiple of Q which will furnish a cyclic variation the sum of which with the first mentioned cyclic variation will be a number consisting solely of a series of nines.

The various qualities of quotients Q derived as stated above are utilized for the devices and games according to the present invention.

In FIGS. 5 and 6 is illustrated a specific kit or device according to the invention for making use of the aforementioned qualities of a quotient Q to provide education and entertainment. The device consists of a set of nine square sticks 10a, 10b, 10c, 10d, 10e, 10f, 10g, 10h and 10i and a box 11 for storing the sticks. The sticks are discrete, merely being illustrated in the preferred way in which they would be used, mutually aligned and abutting against each other. The construction of the box 11 is not critical. The box here illustrated is of the matchbox type, having a drawer 11a slidably received in a sleeve 11b. (I have coined the name "MAGIC STICKS" for the device and the name "MATHEMATCHSTICKS" for the sticks.)

For this particular device a fairly large prime P is chosen to yield a basic quotient Q with a reasonable number of digits to be used conveniently for simple mathematical operations, such as addition, subtraction and multiplication. The prime 73 produces a well proportioned and interesting result. The denominator n will be 9, whereby the quotient Q has eight digits as follows, Q=01369863 and there are a total of nine basic multiples of Q, including Q itself, as follows:

Q = 01,369,863
2Q = 02,739,726
3Q = 04,109,589
4Q = 05,479,452
5Q = 06,849,315
6Q = 08,219,178
9Q = 12,328,767
12Q = 16,438,356
18Q = 24,657,534

These nine numbers and the seven cyclic variations of each thereof, giving a total of seventy-two numbers, represent any and all 8-digit multiples of each other. Consequently, the foregoing listing can be thought of as a "key table." Whenever a multiple of Q has more than eight digits, the additional digits can always be absorbed and dealt with as overlapping digits, as shown above. Accordingly, all sums, differences and multiples of the seventy-two numbers represented by the numbers in the above key table and cyclic variations thereof can be read right out of the table by locating the proper line, i.e., number, in the table. It will be noted also that no sequence of any two digits is ever repeated. Therefore, the first two digits of any 8-digit result of any and all operations will immediately determine the entire result. If the result has only seven digits, a zero should be added on the left to form a key of two digits. If it has nine digits, the first digit should be held in abeyance and the proper key line located by using only the second and third digits. The remaining six digits can then be easily read out, but the surplus digit must be subtracted from the end of the key line of digits, as an overlapping digit.

In implementing a "magic" game according to the invention, a different cyclic variation of each respective basic multiple is placed on each of the four sides of a respective one of nine square sticks 10a to 10i, about two inches long with a cross-section of about a quarter of an inch square (FIGS. 5 and 6). One stick is assigned to each basic multiple and cyclic variations thereof (FIG. 6). This gives thirty-six numbers to choose from for arithmetical operations. For the operation involved these sticks and their seven or eight digit numbers can be choosen at random, and two or more sticks may be lined up as shown in FIG. 5. The numbers appearing on the top surfaces, which are the only surfaces viewed when the sticks are placed on a flat, horizontal support surface, such as a table, will come from different basic multiples, and no relationship or pattern is likely to be noticed. The cyclic variations on the three other sides of each stick mostly remain hidden from view. Preferably, to give the numbers on the sticks a normal appearance whereby the audience (i.e., any one or more individuals who are asked to perform operations with the numbers and are unaware of the underlying mathematical principles of the game) may readily think of each of the numbers as representing multiple millions and be less likely to see them as interrelated sequences of digits, commas are inserted in the conventional places in the numbers on the sticks to separate a hundreds place from a thousands place and a hundred thousands place from a millions place and any initial zeros are eliminated, the person conducting the game supplying these zeros. The person conducting the game may present his ability to determine the last six digits of the number arrived at by the secret operations performed by telling the audience that he need be given only the number of millions in the result, whereupon he will "guess" the remaining six digits.

To utilize all of the aforementioned seventy-two numbers would require eighteen sticks, but the "magic" of the game could be lost because there would be a greater possibility that the audience would discern the telltale appearance of related cyclic numbers when the eighteen sticks are arranged as are the nine sticks in FIG. 5. Of course, two different sets of nine sticks can be provided, each perhaps in a different color to be used by different participants and the results of the arithmetical operations conducted with each comingled for added "magic." In all cases the six digits to the right of the first comma can be determined by the "magician."

Other cases in which Q has fewer than P-1 digits can be analogously implemented, but longer sequences of digits may be too clumsy to work with, although perhaps more baffling. One example is $P=79$, which will produce a thirteen-digit quotient Q with six different basic multiples, including Q itself ($13\times 6=78=P-1$). Here there will be six basic sticks with four thirteen-digit numbers, including any initial zeros, per stick. $P=173$ will produce a forty-three digit quotient Q with four different basic multiples ($43\times 4=172=P-1$), viz., there will be four basic sticks with four forty-three digit numbers, including any initial zeroes, per stick. $P=137$ proves interesting. It will produce a quotient Q of eight digits, including initial zeroes, viz., 00729927 and, therefore, seventeen different basic multiples. While this will make an impressive set of seventeen different sticks, it will leave only five digits to be determined by the person conducting the game upon disclosure by the audience of the first three digits, which are needed to determine a sequence generated by the three-digit prime 137, as explained above. The commas conventionally placed three digits apart to set off the six undisclosed digits in the other exemplary embodiments now may be shifted to set apart five digits, as for example by using only two digits at the right end, like dollars and cents, set off by a decimal point. Thus, the quotient Q will read 007,299.27. Preferably, the initial zeros will not be imprinted on the sticks. Thus, the audience may be told that the person conducting the game need only be told how many thousands of dollars are in the amount arrived at by the secret operations in order for him to "guess" the rest of the result, including cents.

An exemplary explanatory text to accompany a device according to the present invention may be as follows, this particular text being composed in terms of the device or kit illustrated in FIGS. 5 and 6.

In this game there are thirty-six different numbers, all in the millions (seven and eight digits) distributed on four sides of nine square sticks. When several of these large numbers are added, or one is subtracted from another, or multiplied by 2 or 3 or as much as 9, or a series of these operations is performed, it is always possible to guess the last six digits of the final answer without ever knowing what numbers were chosen or what was down with them. This is done by using the "magic" of these sticks. All one needs to know is the digits preceding the last six digits, just one, two or three digits.

The sticks may be tossed out on the table and one or several persons may handle them, each picking two or more sticks and lining them up for addition or subtraction of the numbers appearing horizontally on the top surface. Each person may then perform any operation with these numbers and the results obtained by these persons may even be intermingled by further addition or subtraction, or they may be doubled or tripled, for example, all without disclosing what was done at any stage. It will still be possible to guess the last six digits of the result after being given merely the one or two or three digits preceding the first comma on the left. These digits will always be the key to the full answer, even though thousands of answers may be possible.

All you have to do is to look at the nine lines of digits on the "key table" on the box left in your hand or on the table after removing the sticks. This is only a sampling of the numbers taken from the nine sticks, but actually constitutes a complete key to all possible answers.

The basic key is a pair of digits. Two digits are needed to use the key table. If there is only one digit to the left of the first comma of the final answer, simply mentally put a zero before this single digit. If there are three digits to the left of the first comma, use only the last two digits, holding the first digit in abeyance. Find this pair of digits in the key table in one of the lines, then simply read off the digits to the end of this line, then continue with the beginning of the line until all the six digits, which shall be the six digits to the right of the first comma of the answer number, are read off. The last six digits of the answer are thus read out of any line in "cyclic" order. In some cases the key pair will consist of the last digit of a line followed by the first digit (in cyclic order) and may be a litter harder to find. This possibility should always be considered, whenever the pair is not otherwise readily found. Of course, if the key pair is found at the beginning of a line, the entire line can most readily be read off to the end.

However, when the key has three digits, use only the last two digits to locate the line, but in reading out the last six digits of the answer in cyclic order make sure to subtract the first digit of the key from the end of the line, as read in cyclic order. For example, suppose numbers are chosen and operations performed as follows:

```
      32,876,712
   +   9,589,041
      42,465,753
   ×           4
     169,863,012
```

The key pair is 69 (with 1 held in abeyance). This pair is easily found in the middle of the penultimate line, which enables the "magician" to "guess" 863012, after simply deducting 1 (the first digit of the answer) from 3, the last digit of the key line.

In case anybody suspects the key table of possessing some calculator qualities, it could be easily shown to be merely a sampling of the numbers on the sticks, and, moreover, the key table could be put aside and the person making the challenge could be asked to simply line up the nine sticks as he sees fit (after the answer to be guessed has been calculated but not yet disclosed), whereupon the "magician" can simply read out the answer right from these sticks, which will be even more baffling.

There is one unusual case. Namely, if the key pair is 99, the entire number will consist of nines only. If there is an extra digit, it should be subtracted from the last nine.

While the invention has been described by reference to specific embodiments thereof, it is intended that the hereto appended claims be construed as covering not only such embodiments but all modifications and variations thereof which would be obvious to one of ordinary skill in the art to which the invention pertains.

What I claim is:

1. An educational and recreational mathematical kit, comprising a set of n square sticks of equal length and a plurality of individual digits imprinted on each of the four sides of each of the sticks, all of said digits being of the same orientation and the digits on each of the sides of each respective stick occupying the same specific locations along the respective stick as measured from the ends of the block as the digits on each of the other sides of the respective stick and on each of the sides of all the other sticks the digits on one side of one of the sticks constituting a number which is a quotient obtained by dividing a number constituted of $(P-1)/n$ nines, in which P is a prime number greater than 11 and n is an integer at least 2, by P, n being so selected that $(P-1)/n$ nines is the minimum number of nines divisible by P so that said quotient is an integral number, the digits on each of the other three sides of said one stick each constituting a number which is a respective different cyclic variation of said quotient, said quotient having $(P-1)/n$ digits, including one or more actual or imaginary initial zeros to make up any otherwise occurring one or more digit deficit in said quotient and each cyclic variation of said quotient being formed by shifting a set of 1 to $[(P-1)/n]-1$ of said digits from one end of said number to the other end of said number without changing the sequence of digits in said set and by including in said quotient prior to said shifting one or more actual zeros as said zero or zeros which make up any said otherwise occurring deficit, the digits on one side of each of the other sticks each constituting a respective different number which is a respective different multiple of said quotient but not constituting a said cyclic variation of said quotient or of any other said multiple of said quotient, the digits on each of the other three sides of each of said other sticks each constituting a number which is a respective different said cyclic variation of said respective said multiple of said quotient on said one side of that stick.

2. Kit according to claim 1, further comprising means defining a surface bearing an index imprinted thereon, said index comprising for each of said sticks a number constituting the number on any one face of said stick.

3. Kit according to claim 2, in which said means defining said surface is on a container for said sticks.

4. Kit according to claim 2, in which said container is a box.

* * * * *

UNITED STATES PATENT AND TRADEMARK OFFICE
CERTIFICATE OF CORRECTION

PATENT NO. : 4,260,385
DATED : April 7, 1981
INVENTOR(S) : Max A. Gulack

It is certified that error appears in the above-identified patent and that said Letters Patent are hereby corrected as shown below:

Column 3, line 32, "50" should read -- 5Q --.

Claim 1, line 8, "block" should read -- stick --.

Signed and Sealed this

Thirtieth Day of June 1981

[SEAL]

Attest:

RENE D. TEGTMEYER

Attesting Officer

Acting Commissioner of Patents and Trademarks